United States Patent
Brandt et al.

[19]

[11] Patent Number: 6,021,418
[45] Date of Patent: Feb. 1, 2000

[54] APPARATUS AND METHOD FOR DISPLAYING CONTROL-OBJECTS

[75] Inventors: Marcia Lynn Brandt; Joseph Vincent DiCecco, both of Rochester; Jason Robert Hansen, Chatfield; Thomas Michael Moskalik, Rochester; Timothy Jude O'Keefe, Rochester; Diane Elaine Olson, Rochester; Devon Daniel Snyder, Rochester, all of Minn.

[73] Assignee: International Business Machines Corporation, Armonk, N.Y.

[21] Appl. No.: 08/801,671

[22] Filed: Feb. 18, 1997

[51] Int. Cl.[7] .............................. G06F 17/30; G06F 13/38
[52] U.S. Cl. ............................................ 707/516; 709/203
[58] Field of Search ..................................... 707/516, 513, 707/531, 526, 500, 515, 530; 709/201, 203, 219, 217

[56] References Cited

U.S. PATENT DOCUMENTS

| | | | |
|---|---|---|---|
| 5,339,433 | 8/1994 | Frid-Nielsen | 395/700 |
| 5,530,852 | 6/1996 | Meske et al. | 395/600 |
| 5,546,520 | 8/1996 | Cline et al. | 395/155 |
| 5,572,643 | 11/1996 | Judson | 395/793 |
| 5,740,444 | 4/1998 | Frid-Nielsen | 395/705 |
| 5,778,402 | 7/1998 | Gipson | 707/530 |

FOREIGN PATENT DOCUMENTS 9500902  1/1995  European Pat. Off. .

OTHER PUBLICATIONS

IBM Technical Disclosure Bulletin, vol. 39, No. 08, Aug. 1996, "Internet Kiosk Touch Panel Shell", pp. 85–87.
AT&T Home Page, Kurt Koller and Mike Cosentino, http://www.att.com, Feb. 26, 1997.
U S West–On the Net, CA Fisher, LL Bain, Feb. 26, 1997, http://www.uswest.com/onthenet/indexcontent.html.

Primary Examiner—Joseph H. Feild
Assistant Examiner—Alford W. Kindred
Attorney, Agent, or Firm—Owen J. Gamon

[57] ABSTRACT

An enhanced document browsing method and apparatus. A browser at a client interprets a work-frame code, information, a control-frame code, and a control-object function that identifies the control-frame code. When the browser interprets the work-frame and control-frame codes, it divides the browser window into two frames: a work-frame and a control-frame. When the browser interprets the information, the browser displays the information to the user in the work-frame. When the browser interprets the control-object function, the browser displays a control-object in the control-frame associated with the control-frame code. The control-object can allow the user to control the information in the work-frame. Since the control-object is in the control-frame instead of being only in the work-frame, it is always in view and available to the user, regardless of the scrolling position of the page of information within the work-frame. Thus, the preferred embodiment provides the user with quick and easy access to the control-object.

39 Claims, 7 Drawing Sheets

APPARATUS AND METHOD FOR DISPLAYING CONTROL-OBJECTS

FIELD OF THE INVENTION

This invention relates to the data processing field. More particularly, this invention relates to displaying control-objects, which control information being browsed.

BACKGROUND

When a user at a client computer wishes to browse information at a server computer, the user gives a browser at the client an address of the desired document at the server. The browser at the client transmits this address to the server. The server then transmits the document specified by the address to the client browser, which presents the information in the document to the user.

The Internet is an example of an interconnected network of computers containing clients and servers. A browser is a utility at one computer, called a client, that looks for and browses documents on other computers, called servers, all of which are connected via the Internet. A document is a file of control-codes and information, which the control-codes describe. A page is the information, as formatted by the browser interpreting the control-codes, that the browser presents to the user. This presentation may occur, for example, visually via the browser window on a display screen or aurally via speakers.

So far, the discussion in this application has focused on how users of client computers access, retrieve, and browse information at server computers. But, users at the client would also like to send data to the server and request the server to perform operations. One way to provide these important functions is to use a document that contains a construct called a "button" object that the user may use to control the document being browsed. The word "button" denotes this concept because of the analogy to other, familiar situations. For example, when you want to control your radio, you push a button to change stations. Analogously, when the user at a client wants to control a document being browsed, the user can electronically "push", click on, or otherwise select a button. There are a wide variety of objects, generically called "control-objects", that a user might employ to control a document, including: a pushbutton for selecting an action, a radio button for making one selection among a group of options, a text-box or an input field for entering a line of text, and a check-box for selecting or deselecting a single, independent option.

Although control-objects provide the user with an easy way to control the document, the user is still faced with the task of finding the control-objects, which may be difficult if the control-objects on the page have been scrolled out of view. A page of a document can be larger than is possible for the browser to display at one time. To still allow the user to see the entire page, most browsers provide a scrolling function; the user can see one window's worth of information and the rest is scrolled, or moved, in and out of view. Since the control-object is part of the information on the page, it too is scrolled in and out of view. Thus, it can be very time consuming and frustrating for the user to scroll through the entire page, looking through the vast mass of information for the control-object, especially when the page is much larger than the browser window. This problem is exacerbated by the fact that many pages contain multiple control-objects; there might be one control-object near the top of the page, another somewhere in the middle, and another near the bottom. Since control-objects are one of the primary ways for the user to interact with and request operations of the page, the user may have a need to find and use all of the control-objects on the page, which might be at disparate locations.

For the foregoing reasons, there is a need for quick and easy access to control-objects within a page of a document, independent of the scrolling position of the page.

SUMMARY OF THE INVENTION

It is an object of the present invention to enhance user access to information.

It is another object of the present invention to provide enhanced access to control-objects within a document.

It is another object of the present invention to provide enhanced access to control-objects within a document regardless of a scrolling position of the page within a browser window.

It is another object of the present invention to keep control-objects of a document in view regardless of a scrolling position of the page within a browser window.

These and other objects are achieved by an enhanced document browsing method and apparatus. A browser at a client interprets a work-frame code, information, a control-frame code, and a control-object function that identifies the control-frame code. When the browser interprets the work-frame and control-frame codes, it divides the browser window into two frames: a work-frame and a control-frame. When the browser interprets the information, the browser displays the information to the user in the work-frame. When the browser interprets the control-object function, the browser displays a control-object in the control-frame associated with the control-frame code. The control-object can allow the user to control the information in the work-frame. Since the control-object is in the control-frame instead of being only in the work-frame, it is always in view and available to the user, regardless of the scrolling position of the page of information within the work-frame. Thus, the preferred embodiment provides the user with quick and easy access to the control-object.

DESCRIPTION OF THE PREFERRED EMBODIMENT

Technology Overview

Figure 1A:
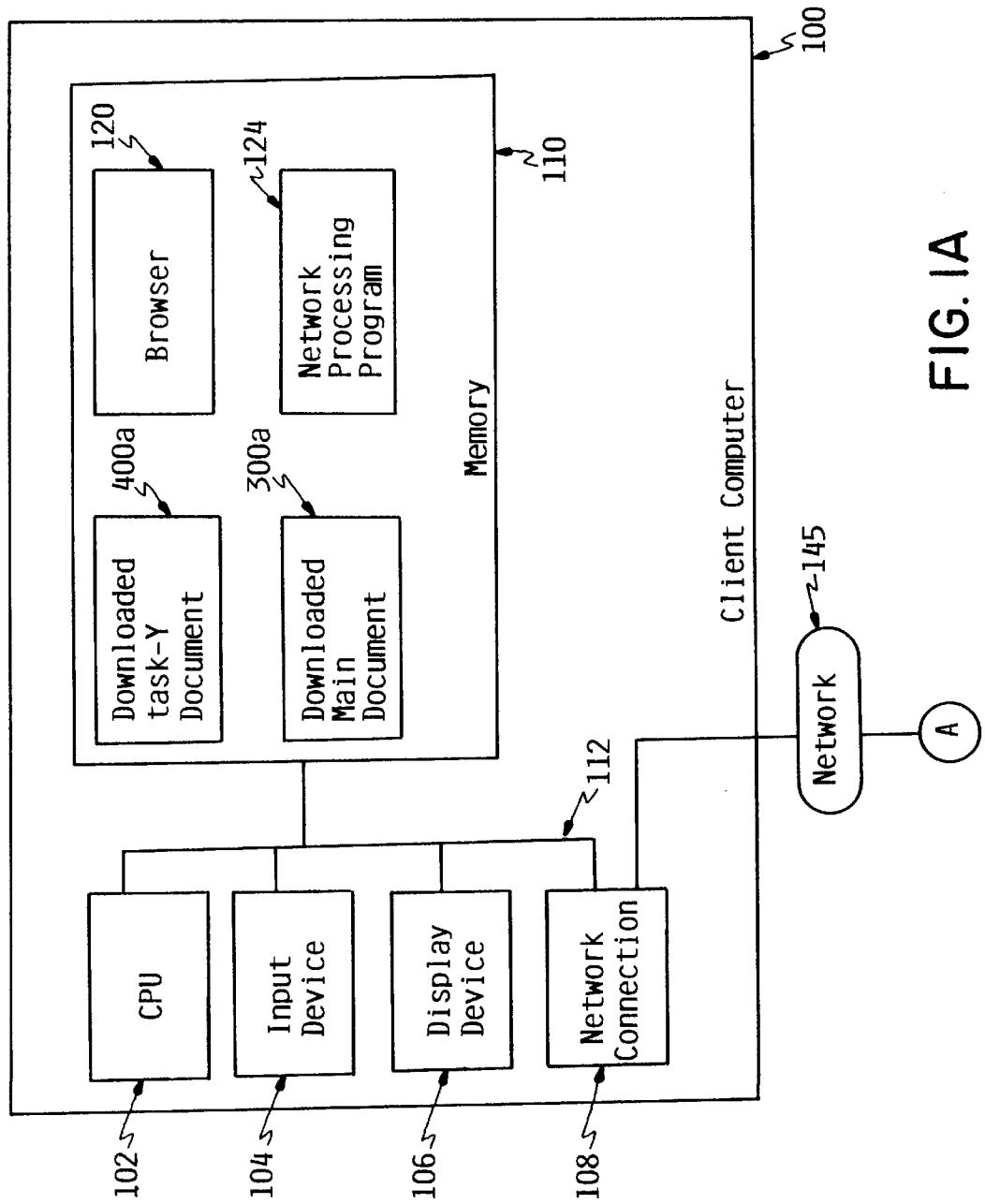
FIG. 1 is a block diagram that shows a client computer attached to a server computer via a network, according to the preferred embodiment.

The Internet is an example of a interconnected network of computers. A browser is a utility at the client that looks for and browses documents at the server. Examples of browsers are IBM's Web Explorer, Netscape Navigator, and NCSA (National Center for Supercomputing Applications) Mosaic.

A document is a file of control-codes—e.g. HyperText Markup Language codes (HTML)—and information, which the control-codes describe. HTML documents are purely textual and are instructions to the browser as to what to display or play back, as well as attributes (such as size or location on the page) to apply to what is displayed or played back. A developer of an HTML document may directly hand generate the HTML text or may use one of many tools to assist in this generation. The developer may also develop, search for, or buy multimedia objects (digitized graphic, sound files, or video files) to specify in the HTML text so as to cause their display or play back by the browser upon parsing the HTML. A page is the information, as formatted by the browser interpreting the control-codes, that the browser presents to the user. This presentation may occur, for example, visually via the browser window on a display screen or aurally via speakers.

In order to browse a document at a server, the user enters a Uniform Resource Locator (URL), which is an address of the desired document at the server, via the browser at the client computer. The browser at the client computer uses this URL to communicate with the server computer. The server transmits the document specified by the URL to the client browser for presentation to the user. The retrieved document may itself contain further embedded URLs linking to multimedia objects (such as text, bitmaps, sound files, or video files), so the client browser parses the retrieved document and downloads the linked multimedia objects for presentation via display or playback.

A way to send data from the client to the server and request the server to perform operations is to use a document that contains a construct that in HTML is called a "form". The word "form" denotes this concept because of the analogy to other, familiar situations. For example, when you want to submit data to your insurance company, you enter your data on the insurance company's form and mail it to them. Analogously, when a user at a client wants to submit data to a server, the user fills out an electronic HTML form. Thus a form, when interpreted by the browser, allows the user at the client to request operations of the server and submit data to the server.

A form may contain a "button" object that the user may use to control the document being browsed. The word "button" denotes this concept because of the analogy to other, familiar situations. For example, when you want to control your radio, you push a button to change stations. Analogously, when the user at a client wants to control a document being browsed, the user can electronically "push", click on, or otherwise select a button. There are a wide variety of form objects, generically called "control-objects", that a user might employ to control a document, including: a push-button for selecting an action, a radio button for making one selection among a group of options, a text-box or an input field for entering a line of text, and a check-box for selecting or deselecting a single, independent option.

A page of a document can be larger than is possible for the browser to display at one time. To still allow the user to see the entire page, most browsers provide a scrolling function; the user can see one window's worth of information and the rest is scrolled, or moved, in and out of view. Since the control-object is part of the information on the page, it too is scrolled in and out of view. Thus, it can be very time consuming and frustrating for the user to scroll through the entire page, looking through the vast mass of information for the control-object, especially when the page is much larger than the browser window.

This problem is exacerbated by the fact that many pages contain multiple control-objects; there might be one control-object near the top of the page, another somewhere in the middle, and another near the bottom. Since control-objects are one of the primary ways for the user to interact with and request operations of the page, the user may have a need to find and use all of the control-objects on the page, which might be at disparate locations.

Preferred Embodiment Overview

A document at a server contains a work-frame code, information, a control-frame code, and a control-object function that identifies the control-frame code. When a browser at a client retrieves the document from the server, the browser interprets the work-frame and control-frame codes and divides the browser window into at least two frames; for example, a work-frame and a control-frame. When the browser interprets the information, the browser displays the information to the user in the work-frame. When the browser interprets the control-object function, the browser displays a control-object in the control-frame associated with the control-frame code. The control-object can allow the user to control the information in the work-frame. Since the control-object is in the control-frame instead of being only in the work-frame, it is always in view and available to the user, regardless of the scrolling position of the page of information within the work-frame.

DETAILED DESCRIPTION

Figure 1B:
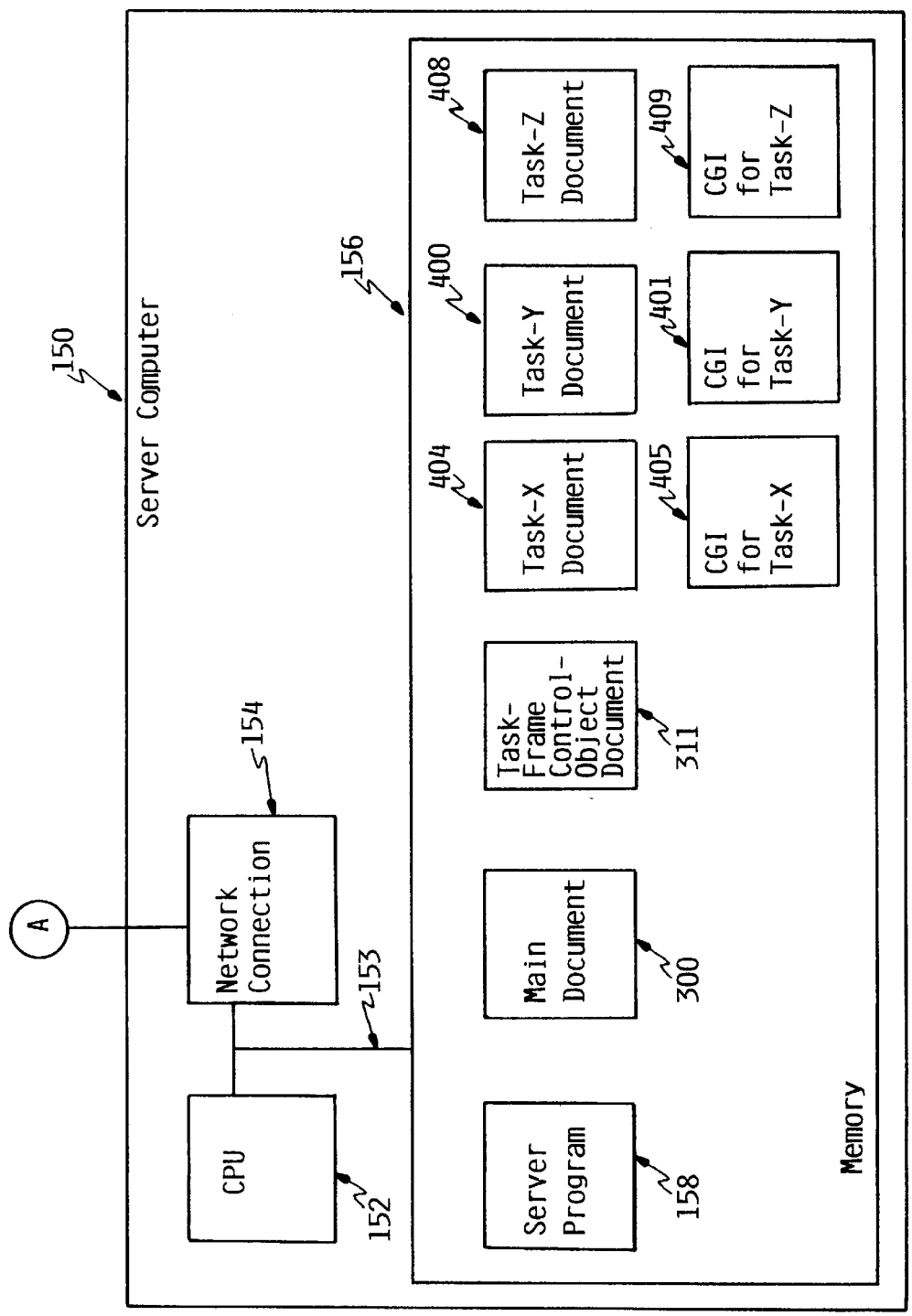

With reference now to the figures and in particular with reference to FIG. 1, there is depicted a block diagram of a data-processing system in which a preferred embodiment may be implemented. Computer 100 functioning as a client is shown connected via network 145 to server computer 150. In the preferred embodiment, network 145 is the Internet, although it could be another kind of network such as a Local Area Network (LAN) or an Intranet.

Client computer 100 contains Central Processing Unit (CPU) 102, which is a processor connected via bus 112 to input device 104, display device 106, network connection 108, and memory 110.

Input device 104 can be any suitable device for the user to give input to client computer 100; for example: a keyboard, key-pad, light-pen, touch-screen, button, mouse, trackball, or speech-recognition-unit could be used. Display device 106 could be any suitable display device, such as a display screen, television set, or operator panel. Although input device 104 is shown as being separate from display device 106, they could be combined; for example: a display with an integrated touchscreen or a display with an integrated keyboard.

Memory 110 is storage sufficiently large to hold the necessary programming and data structures. While memory 110 is shown as a single entity, memory 110 may in fact comprise a plurality of storage devices, and that memory may exist at multiple levels, from high-speed registers and caches to lower speed but larger DRAM chips, to floppy-disk drives, fixed-disk drives, tape drives, CD-ROM drives, or optical drives. Memory 110 can be loaded and stored between its various levels as needed. While memory 110 is shown as existing entirely in client computer 100, memory 110 may in fact be remote memory that exists anywhere in network 145 or in a Local Area Network, not shown. Memory 110 contains browser 120, downloaded main document 300*a*, downloaded task-y document 400*a*, and network-processing program 124. Network-processing program 124 contains instructions that, when executed on CPU 102, provide support for connecting client computer 100 to computers in network 145 such as server computer 150.

CPU 102 is suitably programmed by browser 120 to browse documents such as downloaded main document 300a and downloaded task-y document 400a. In the alternative, the function of browser 120 could be implemented by control circuitry through the use of logic gates, programmable-logic devices, or other hardware components in lieu of a processor-based system. In the preferred embodiment, browser 120 is Netscape Navigator, but browser 120 could be any kind of interpreter that interprets control-codes, interprets scripts, and supports frames and control-objects.

In the preferred embodiment, network connection 108 is a TCP/IP network connection, although it could be any type of suitable network connection. Client computer 100 is connected to network 145 and ultimately to server computer 150 via telephone lines, cable lines, or by wireless communications. Although client computer 100 and server computer 150 are shown as being separate entities from network 145, they could, in fact, be part of network 145.

Server computer 150 contains Central-Processing-Unit (CPU) 152 connected via bus 153 to network connection 154 and memory 156. Network connection 154 connects server computer 150 to network 145. Memory 156 contains task-frame control-object document 311, task-x document 404, task-y document 400, task-z document 408, CGI program for task-x 405, CGI program for task-y 401, CGI program for task-z 409, server program 158, and main document 300.

Main document 300 is a main HTML (Hyper Text Markup Language) document in the preferred embodiment. Main document 300 contains pointers to task-frame control-object document 311, as is further described under the description for FIG. 2.

The contents of task-y document 400 is further described under the description for FIG. 4, below. Task-frame control-object document 311 contains control-codes for control-objects used by main document 300 and referenced by main document 300 via hyperlinks. Although task-frame control-object document 311 is shown as being contained in server computer 150, it could be on any server in network 145. Task-frame control-object document 311 is further described under the description for FIG. 3, below.

Server program 158 contains computer executable instructions that, when executed on CPU 152, provide support for connecting server computer 150 to network 145 via network connection 154 and responding to requests from client computer 100. In the preferred embodiment, server program 158 supports HTTP (Hypertext Transport Protocol).

CGI (Common Gateway Interface) programs 405, 401, and 409 are programs invoked to process an HTML form when it is submitted from the client 100 to server 150. Although only one server computer is shown in FIG. 1, there may actually be a multiplicity of server computers. Although server computer 150 is shown as being directly connected to network 145, it could be connected indirectly such as via a Local Area Network, not shown.

Client computer 100 may be implemented using any suitable client computer, such as an IBM personal computer running the OS/2® operating system. Client computer 100 could be connected directly to network 145 via network connection 108 or could be connected indirectly, such as via a Local Area Network, not shown.

Server computer 150 may be implemented using any suitable server such as the AS/400® computer system, running the OS/400® operating system, both products of International Business Machines Corporation, located in Armonk, N.Y.

Client computer 100 and server computer 150 could be other types of computer systems, whether they be microcomputers such as an Apple Macintosh or mainframe computers such as an IBM System/390, and still fall within the spirit and scope of this invention. In addition, client computer 100 and server computer 150 could be microcomputers such as described above but connected to a larger computer system. Client computer 100 could also be a computer such as an Internet appliance or thin client that does not have a fixed disk drive. It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, the invention should not be limited to the particular hardware designs, software designs, communications protocols, performance parameters, or application-specific functions disclosed herein.

Figure 2:
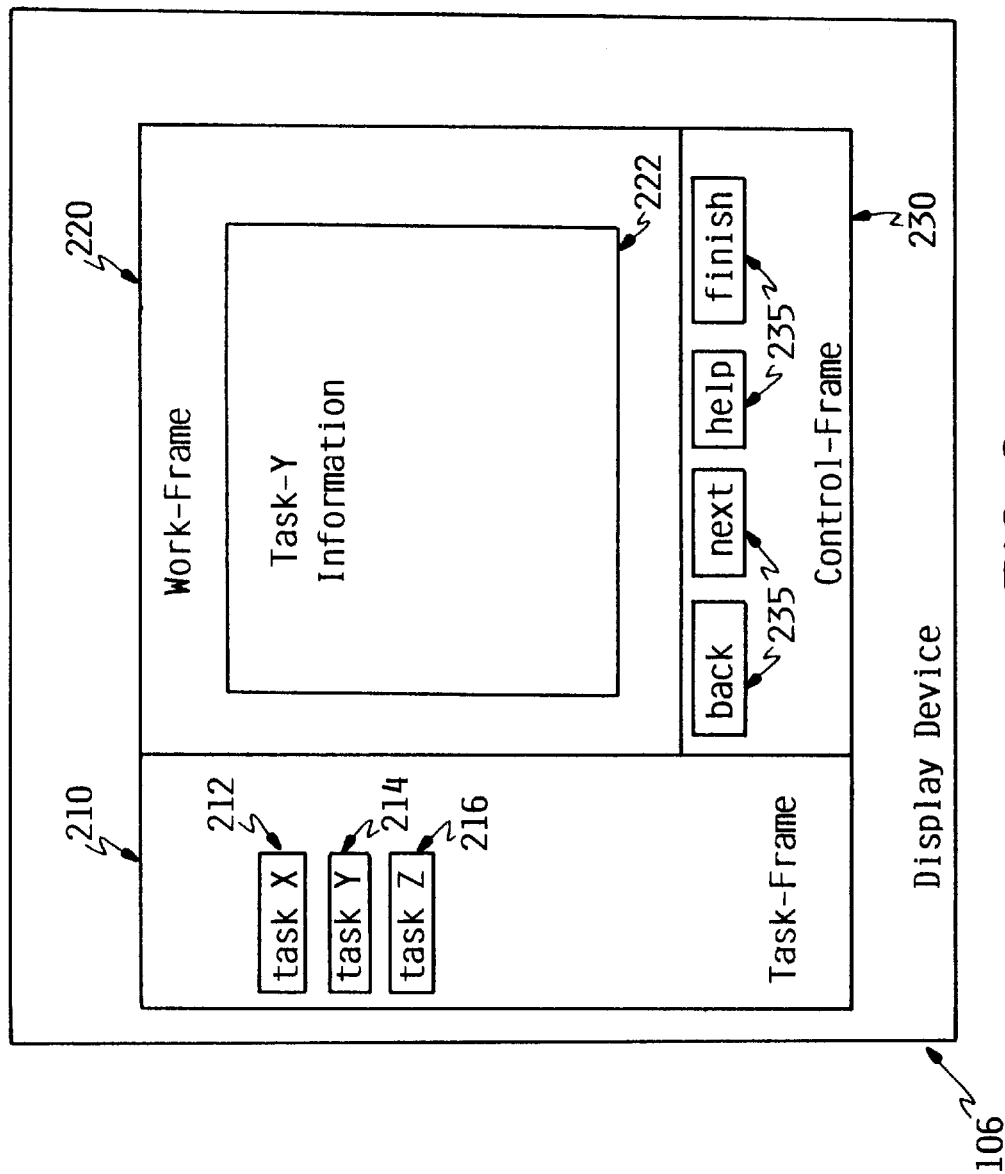
FIG. 2 is a block diagram of a browser window in a display screen, according to the preferred embodiment.

Referring to FIG. 2, there is shown a block diagram of a sample screen on display device 106. A window on display device 106 is divided into three frames: task-frame 210, work-frame 220, and control-frame 230. Browser 120 creates the frames in the window by interpreting frame control-codes 310 in downloaded main document 300a, as further described under the description for FIGS. 3 and 5 below. Task-frame 210 contains task-x button 212, task-y button 214, and task-z button 216. Browser 120 created these task buttons by interpreting downloaded main document 300 and task-frame control-object document 311 as further described below under the description for FIG. 3 and FIG. 5. In the example shown in FIG. 2, the user has selected task-y button 214. This selection caused browser 120 to download task-y document 400 as downloaded task-y document 400a and display task-y information 415 as formatted task-y information 222 in work-frame 220 based on the formatting control-codes in task-y information 415. Browser 120 has further interpreted the control-codes (or control tags) in task-y document 400 and based on those control-codes has displayed control-objects 235, which in this example are buttons, in control-frame 230 as further described under the description for FIGS. 4 and 5. As shown in control-frame 230, the sample buttons for control-objects 235 in this example are "back", "next", "help", and "finish", although a wide variety of control functions could be used, including but not limited to "OK", "cancel", "add", and "apply". Although this example uses buttons, any control-object could be used. A control-object is an object that when selected by the user, acts in operation to control the contents of the information displayed in work-frame 220, or it acts to submit information to server computer 150. Examples of types of control-objects include: a text-box or an input field for entering a line of text, a push-button for selecting an action (as in this example), a radio button for making one selection among a group of options, a check-box for selecting or deselecting a single, independent option, and a graphical or text hypertext link. In the preferred embodiment, control-frame 230 is disposed adjacent to and beneath work-frame 220, although they could be positioned anywhere.

Figure 3:
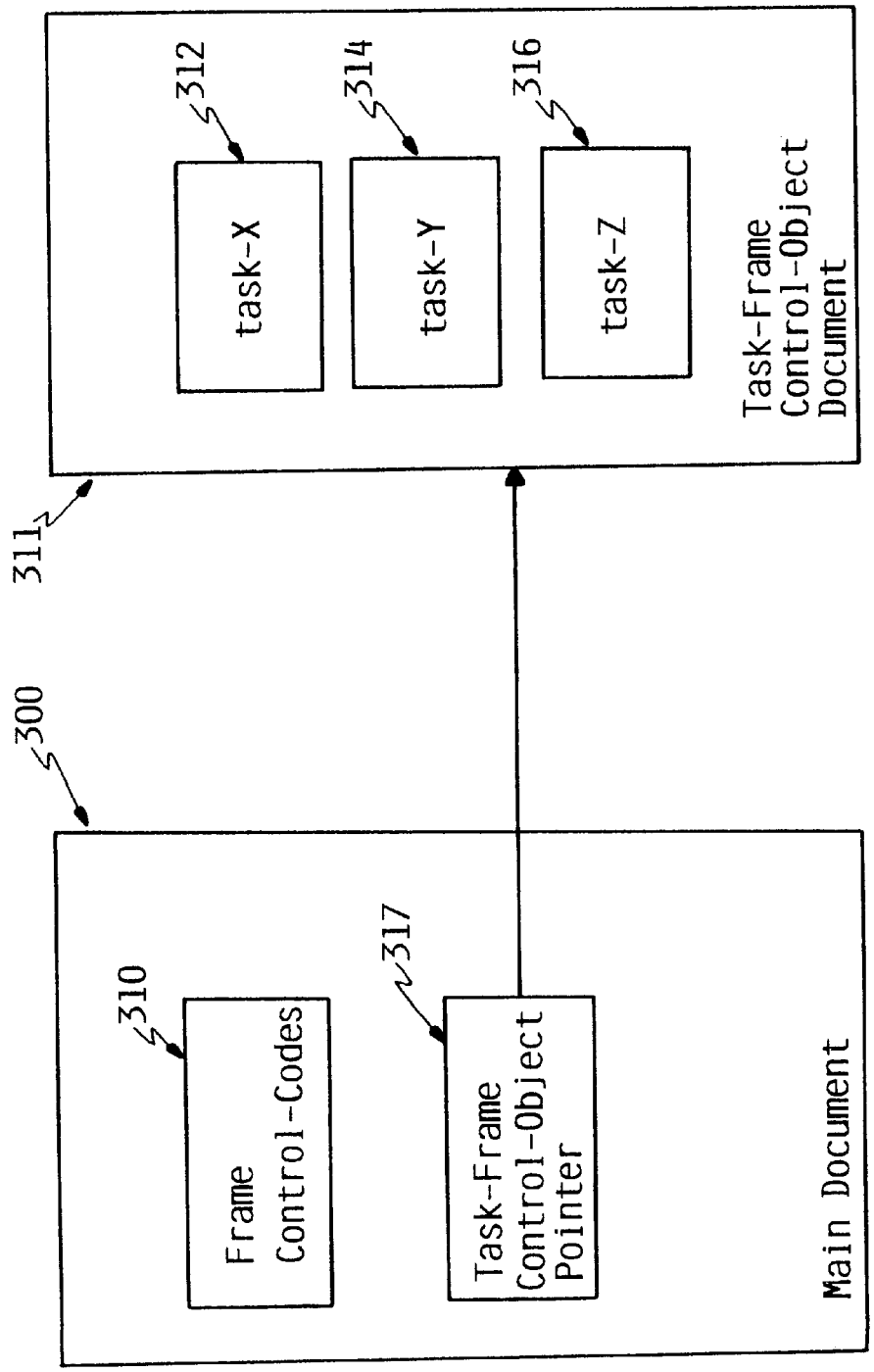
FIG. 3 is a block diagram of a main document and a task-frame control-object document, according to the preferred embodiment.

Referring to FIG. 3, block diagram examples of main document 300 and task-frame control-object document 311 are shown, according to the preferred embodiment. Main document 300 contains frame control-codes 310 and pointer to task-frame control-object document 317. Browser 120 interprets frame control-codes 310 in order to create task-frame 210, work-frame 220, and control-frame 230. The following is an example of frame control-codes 310 written in HTML format:

```
<HEAD>
<TITLE>IBM Network Station Manager</TITLE>
</HEAD>
<SCRIPT LANGUAGE="JavaScript">
    [ . . . JavaScript statements and functions are in here . . . ]
</SCRIPT>
<FRAMESET COLS="136,*">
    <FRAME SRC="button.htm" NAME="taskFrame">
    <FRAMESET ROWS="*,65">
        <FRAME SRC="startmgr.htm" NAME="mainFrame">
        <FRAME SRC="button.htm" NAME="buttonFrame">
    </FRAMESET>
</FRAMESET>
```

Task-frame control-object document 311 contains task-x control-object codes 312, task-y control-object codes 314, and task-z control-object codes 316. These control-codes are interpreted by browser 120 to display task-x control-object 212, task-y control-object 214, and task-z control-object 216, respectively. An example of the control-codes in task-y 314 that displays task-y control-object 214 and executes the functions performed when the user clicks on the task-y 214 control-object are shown in the following sample HTML and Java Script:

```
<HTML>
<HEAD>
<TITLE>Tasks</TITLE>
<SCRIPT LANGUAGE="JavaScript">
[ . . . other task functions . . . ]
function goTotasky( ) {
parent.taskFrame.document.taskForm.NSM_TAG_
    CLIENT.value="tasky"
    parent.taskFrame.document.taskform.submit( )
}
</SCRIPT>
</HEAD>
<BODY onLoad="initTaskFrame( )">
<CENTER><FONT SIZE=2><STRONG>Setup
Tasks</STRONT></FONT></CENTER>
<SCRIPT LANGUAGE="JavaScript">
    var text="<TABLE    CELLPADDING=1
    CELLSPACING=1>"
    +"<TR><TD></TD></TR><TR><TD></TD></TR>"
    +"<TR><TD><A HREF='JavaScript:goTotasky( )'"
    +"<IMG NAME='tasky'SRC='../image/tasky.gif'"
    +"border=0 ALIGN=LEFT HEIGHT=13 WIDTH=
        14></A></TD>"
    +"<TD><A HREF='JavaScript:goTotasky( )'"
    +"onMouseOver='window.status=hwMsg; return
        true'>"
    +"<FONT SIZE=2>Hardware</FONT></A></TD></
        TR>"
    TEXT+="<TR></TR><TR></TR>"
<FORM NAME="taskForm" METHOD=POST ACTION=
    "/QYTC/QYTCMCSP.PGM"
</FORM>
</BODY>
<SCRIPT LANGUAGE="JavaScript">
document.close( )
</SCRIPT>
</HTML>
```

Figure 4:
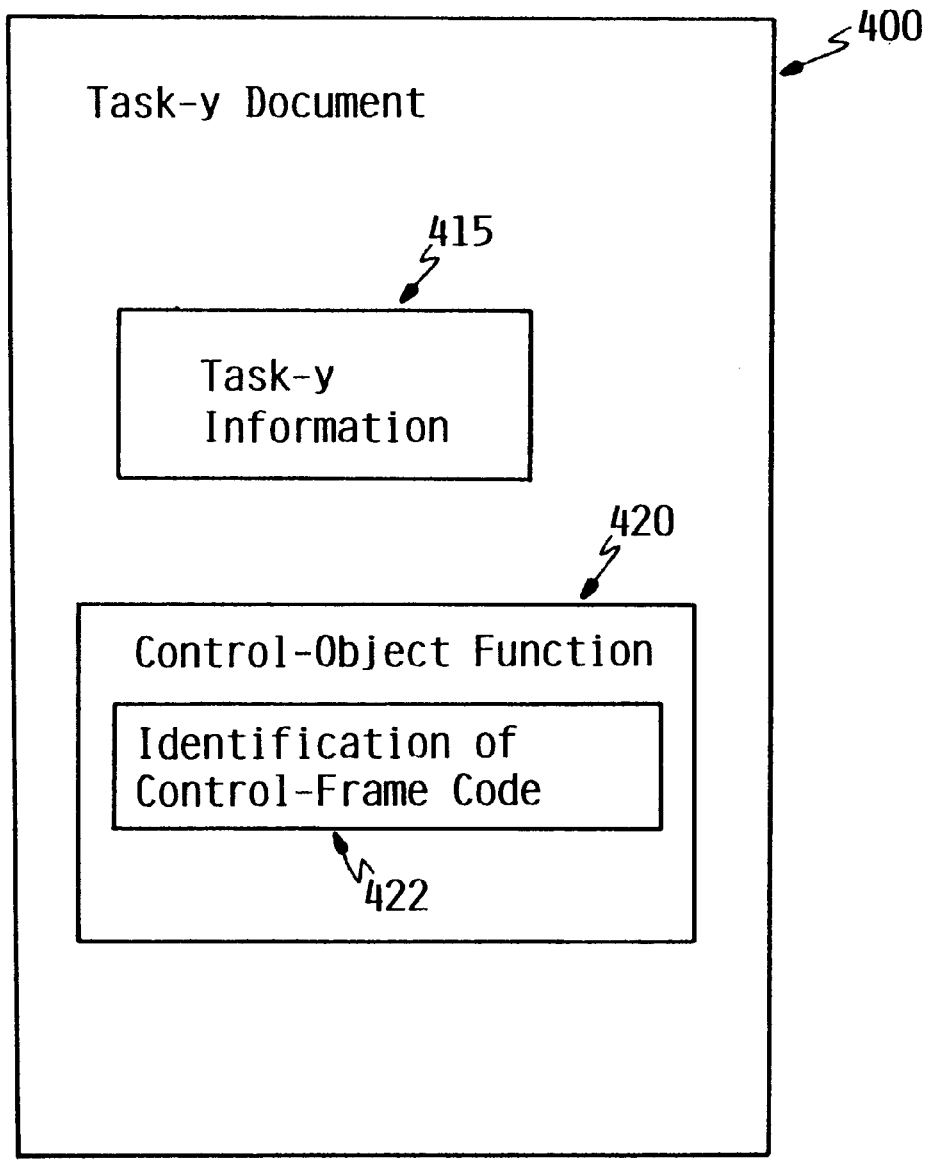
FIG. 4 is a block diagram of a task document, according to the preferred embodiment.

FIG. 4 depicts a block diagram of task-y document 400, which contains task-y information 415, and control-object function 420. Control-object function 420 identifies the frame in which to display the control-object via identification code 422. When interpreted by browser 120, this identification code will be used to identify the place to display the control-object. In the preferred embodiment, control-object function 420 is written in JavaScript and control-object function 420, when interpreted by browser 120 displays a button in control-frame 230. But, control-object function 420 could display any type of control-object, such as text-box, a radio-button, or a check-box, as previously described. In the preferred embodiment, control-object function 420 is contained within task-y document 400, but it could be in a separate document, such as a separate HTML file or in a separate JavaScript file. JavaScript is an object scripting language for the creation and customization of applications that link together objects and resources on both clients and servers. (JavaScript is a trademark of Sun Microsystems.) JavaScript is designed for use by HTML page authors and application developers to dynamically script the behavior of objects running on either the client or the server. An example of the control-codes in task-y document 400 is shown in the following sample HTML and Java Script:

```
<HTML>
<HEAD>
<TITLE>Tasky</TITLE>
<SCRIPT LANGUAGE="JavaScript">
function loadTermButtonFrame( ) {
    // The next three lines actually write the buttons into
        buttonFrame. // The contents of the variables
        buttonDoc1, taskyNextButton, and // buttonDoc1Cont
        are defined below
    parent.buttonFrame.document.open( )
    parent.buttonFrame.document.write( buttonDoc1+
        taskyNextButton+buttonDoc1Cont)
    parent.buttonFrame.document.close( )
} // END OF FUNCTION loadtaskyButtonFrame( )
buttonDoc1="<HTML><HEAD></HEAD><BODY
BGCOLOR='#FFFFFF'><FORM><CENTER>"
    +"<TABLE CELLPADDING=0 CELLSPACING=
        0><TR>"
    +"<TD    ALIGN=CENTER><A    HREF=
        'JavaScript:parent.previous( )'"
    +"<IMG SRC="back.gif"border=0><BR>"
    +"<FONT SIZE=2>Back</FONT></A></
        TD><TD><BR><TD>"
    +"<TD ALIGN=CENTER><A HREF="
taskyNextButton=
"'JavaScript:parent.subtaskyFrm
    (parent.mainFrame.document.scopeForm)'">
buttonDoc1Cont=""<img src="+nextLoc+"border=
    0><BR>"
    +"<FONT SIZE=2>Next</FONT></A></
        TD><TD><BR><TD>"
    +"<TD><BR><TD><TD><BR><TD>"
    +"<TD    ALIGN=CENTER><A    HREF=
        'JavaScript:parent.showHelp(parent.selectedHelp)'">
    +"<IMG SRC="help.gif"><BR>"
    +"<FONT SIZE=2>Help</FONT></A></TD>"
    +"</TR></TABLE>"
</SCRIPT>
</HEAD>
<BODY    BGCOLOR="#FFFFFF"onLoad=
    "loadtaskyButtonFrame( )">
```

</BODY>
</HTML>

Figure 5:
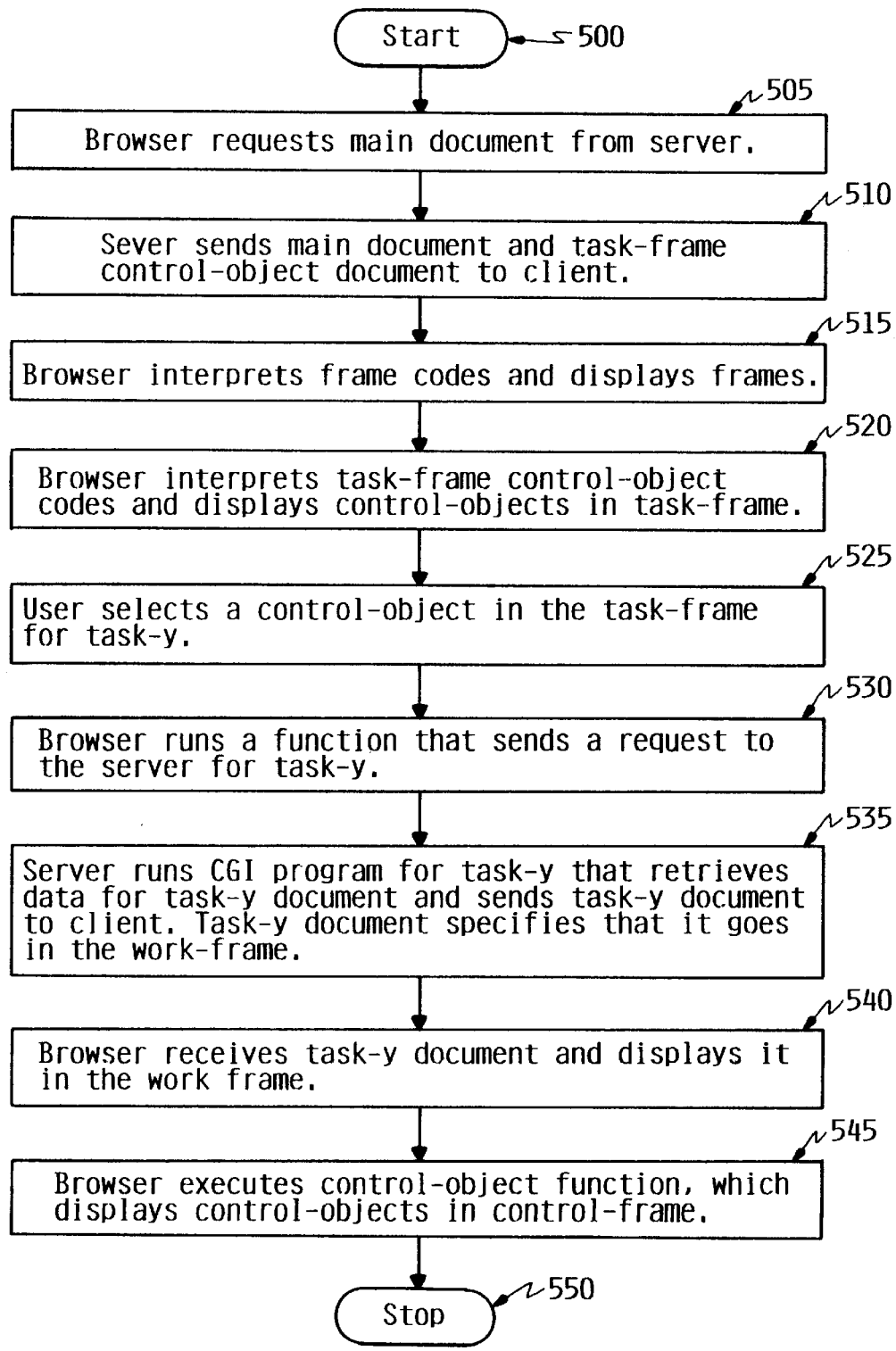
FIG. 5 is a flowchart that shows the process steps of the operation of the preferred embodiment.

An example operation of the preferred embodiment, as shown in the flowchart of FIG. 5, will now be described in more detail. The example starts at block 500. At block 505, browser 120 at client computer 100 requests main document 300 from server computer 150. At block 510, server computer 150 sends main document 300 and associated task-frame control-object document 311 to client 100. At block 515, browser 120 interprets frame control-codes 310 in order to display task-frame 210, work-frame 220, and control-frame 230. At block 520, browser 120 interprets task-frame control-object document 311 in order to display control-objects task-x button 212, task-y button 214, and task-z button 216 in task-frame 210. The control-codes in task-frame control-object document 311 direct browser 120 how to display the proper control-objects in task-frame 210. At block 525, the user selects control-object task-y 214. At block 530, browser 120 executes a function that sends a request to server computer 150 for task-y. At block 535, server computer 150 executes CGI program for task-y 401, which fills data into task-y document 400 and sends it to client computer 100. At block 540, browser 120 receives task-y document 400 as downloaded task-y document 400a, interprets the formatting control-codes in downloaded task-y document 400a and displays formatted task-y information 415 in work-frame 220. At block 545, browser 120 executes control-object function 420, which directs the browser to display control-objects 235 in control-frame 230.

Figure 6:
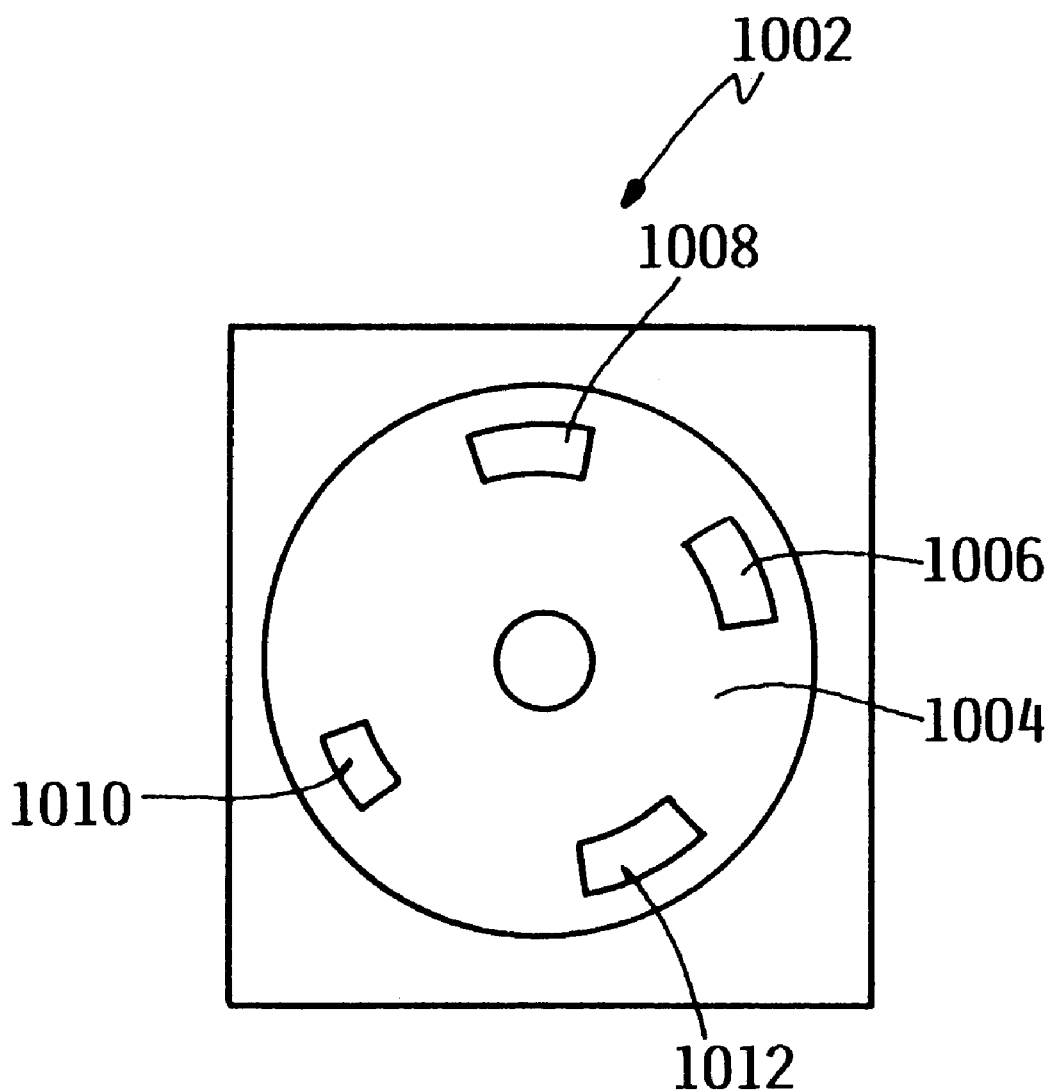
FIG. 6 is a block diagram of an article of manufacture or a computer program-product including a storage medium for storing thereon computer-executable or interpretable code for carrying out the preferred embodiment.

FIG. 6 shows an article of manufacture or a computer program-product including a signal-bearing-media for storing thereon program means for carrying out the method of this invention in the system of FIG. 1. While the present invention has been described in the context of a computer system, the mechanisms of the present invention are capable of being distributed as a program-product in a variety of forms, and the present invention applies equally regardless of the particular type of signal-bearing-media used to actually carry out the distribution. Examples of signal-bearing-media include: recordable media, such as floppy disks and CD-ROMs, and transmission media such as digital and analog communications links, including wireless communications links.

An example of such an article of manufacture is illustrated in FIG. 6 as pre-recorded floppy disk 1002. Floppy disk 1002 is intended for use with a data processing system, and includes magnetic storage medium 1004, and program means 1006, 1008, 1010, and 1012 recorded thereon, for directing browser 120 to facilitate the practice of this invention. It will be understood that such apparatus and articles of manufacture also fall within the spirit and scope of this invention.

While this invention has been described with respect to the preferred and alternative embodiments, it will be understood by those skilled in the art that various changes in detail may be made therein without departing from the spirit, scope, and teaching of the invention. Although the preferred embodiment has been described with respective to buttons in forms, any type of mechanism to control the document being browsed could be used. Also, computer networks may be employed quite differently from what is known today; for example, there might be a computer network within an automobile with a server computer controlling one element, such as the fuel injection, and a client computer controlling another element, such as the operator display. Further, the type of applications that use a browser may change from what is known today. In addition, browsing technology may become widely employed in consumer applications such as operator panels for consumer electronics, appliances, and automobiles. Finally, although the preferred embodiment has been described with respect to a separate client and server computers, the client and server could exist on the same computer system. Accordingly, the herein disclosed invention is to be limited only as specified in the following claims.

What is claimed is:

1. A method for presenting a document at a client, wherein the document comprises information, a control-code, a third frame code, and a task code, comprising:

retrieving the information from a server, wherein the client and the server are connected via a network;

displaying the information in a first frame at the client;

translating the control-code to a control-object; and displaying the control-object in a second frame at the client;

creating a third frame in response to the third frame code; and displaying a task control-object in the third frame in response to the task code, wherein the retrieving step is executed in response to a user selecting the task control-object.

2. The method of claim 1, wherein the document further comprises a first and a second frame code, further comprising:

creating the first and second frames in response to the respective first and second frame codes.

3. The method of claim 1, further comprising:

displaying the control-object in the first frame; and scrolling the information in the first frame, so that the control-object in the first frame is out of view.

4. The method of claim 1, wherein the document further comprises a plurality of control-codes, and wherein the translating step further comprises translating the plurality of control-codes to a plurality of control-objects.

5. The method of claim 4, wherein the displaying step further comprises:

displaying the plurality of control-objects in the second frame at the client.

6. The method of claim 1, further comprising:

controlling the information in the first frame in response to a user selecting the control-object in the second frame.

7. The method of claim 1, wherein the control-object comprises a button.

8. The method of claim 1, wherein the control-object comprises a check-box.

9. The method of claim 1, wherein the control-object comprises a radio button.

10. The method of claim 1, wherein the control-object comprises a text-box.

11. The method of claim 7, wherein the button identifies a "back" function.

12. The method of claim 7, wherein the button identifies a "help" function.

13. The method of claim 7, wherein the button identifies a "finish" function.

14. A program-product, comprising:

a work-frame code that, when interpreted by a browser at a client, displays a work-frame at the client;

information that, when interpreted by the browser, is displayed in the work-frame;

a control-frame code that, when interpreted by the browser, displays a control-frame at the client;

a control-object function that identifies the control-frame code, wherein the control-object function, when interpreted by the browser, displays a control-object in the control-frame;

a task-frame code that, when interpreted by the browser, creates a task-frame;

a task code that, when interpreted by the browser, displays a task control-object in the task-frame, wherein the browser retrieves the information and the control-object function from a server in response to a user selecting the task control-object, wherein the client and the server are connected via a network; and signal-bearing-media bearing the work-frame code, the information, the control-frame code, the task-frame code, the task code, and the control-object function.

15. The program-product of claim 14, wherein a first document, borne by the signal-bearing-media, comprises the work-frame code and the control-frame code.

16. The program-product of claim 15, wherein a second document, borne by the signal-bearing-media, comprises the information.

17. The program-product of claim 16, wherein the second document further comprises the control-object function.

18. The program-product of claim 14, wherein the control-object in the control-frame controls the information in the work-frame in response to a user selecting the control-object.

19. The program-product of claim 14, wherein the control-object comprises a button.

20. The program-product of claim 14, wherein the control-object comprises a check-box.

21. The program-product of claim 14, wherein the control-object comprises a text-box.

22. The program-product of claim 14, wherein the control-object comprises a radio button.

23. The program-product of claim 19, wherein the button identifies a "next" function.

24. The program-product of claim 19, wherein the button identifies a "back" function.

25. The program-product of claim 19, wherein the button identifies a "help" function.

26. The program-product of claim 19, wherein the button identifies a "finish" function.

27. A server connected via a network to a client, comprising:

a work-frame code that, when retrieved and interpreted by a browser located at the client, displays a work-frame at the client;

information that, when retrieved and interpreted by the browser, is displayed in the work-frame;

a control-frame code that, when retrieved and interpreted by the browser, displays a control-frame at the client;

a control-object function that identifies the control-frame code, wherein the control-object function, when retrieved and interpreted by the browser, displays a control-object in the control-frame;

a task-frame code that, when interpreted by the browser, creates a task-frame;

a task code that, when interpreted by the browser, displays a task control-object in the task-frame, wherein the browser retrieves the information and the control-object function from the server in response to a user selecting the task control-object; and memory, containing the work-frame code, the information, the control-frame code, the task-frame code, the task code, and the control-object function.

28. The server of claim 27, further comprising:

a first document, located in the memory, wherein the first document comprises the work-frame code and the control-frame code.

29. The server of claim 28, further comprising:

a second document, located in the memory, wherein the second document comprises the information.

30. The server of claim 29, wherein the second document further comprises the control-object function.

31. The server of claim 27, wherein the control-object in the control-frame controls the information in the work-frame in response to a user selecting the control-object.

32. The server of claim 27, wherein the control-object comprises a button.

33. The server of claim 27, wherein the control-object comprises a check-box.

34. The server of claim 27, wherein the control-object comprises a text-box.

35. The server of claim 27, wherein the control-object comprises a radio button.

36. The server of claim 32, wherein the button identifies a "next" function.

37. The server of claim 32, wherein the button identifies a "back" function.

38. The server of claim 32, wherein the button identifies a "help" function.

39. The server of claim 32, wherein the button identifies a "finish" function.

* * * * *